US010715544B2

(12) United States Patent
Gould et al.

(10) Patent No.: US 10,715,544 B2
(45) Date of Patent: Jul. 14, 2020

(54) METHOD, APPARATUS AND SYSTEM FOR CALCULATING A RISK SCORE OF A USER REQUEST BY A USER ON A WEB APPLICATION

(71) Applicants: Sony Corporation, Tokyo (JP); Sony Interactive Entertainment LLC, San Mateo, CA (US)

(72) Inventors: Lee Kirsten Gould, Carlsbad, CA (US); Conor Aylward, Brussels (BE); Cristian Traum, Liege (BE); Igor Bondarenko, Antwerp (BE); Alexei Karpov, Wezembeek-Oppem (BE); Hugo Embrechts, Bierbeek (BE)

(73) Assignees: SONY CORPORATION, Tokyo (JP); SONY INTERACTIVE ENTERTAINMENT LLC, San Mateo, CA (US)

( * ) Notice: Subject to any disclaimer, the term of this patent is extended or adjusted under 35 U.S.C. 154(b) by 218 days.

(21) Appl. No.: 15/016,996

(22) Filed: Feb. 5, 2016

(65) Prior Publication Data

US 2017/0230406 A1    Aug. 10, 2017

(51) Int. Cl.
| | |
|---|---|
| *H04L 29/06* | (2006.01) |
| *G06F 21/31* | (2013.01) |
| *G06F 21/52* | (2013.01) |
| *G06F 21/56* | (2013.01) |
| *G06F 21/55* | (2013.01) |
| *G06Q 20/36* | (2012.01) |

(52) U.S. Cl.
CPC ........ *H04L 63/1441* (2013.01); *G06F 21/316* (2013.01); *G06F 21/52* (2013.01); *G06F 21/552* (2013.01); *G06F 21/566* (2013.01); *G06Q 20/36* (2013.01); *H04L 63/08* (2013.01); *H04L 63/10* (2013.01); *H04L 63/1425* (2013.01); *G06F 2221/2133* (2013.01); *H04L 63/1483* (2013.01)

(58) Field of Classification Search
CPC . H04L 63/1441; H04L 63/08; H04L 63/1425; H04L 63/10; H04L 63/1483; H04L 63/1416; G06Q 20/36; G06F 2221/2133; G06F 21/552; G06F 21/566; G06F 21/52; G06F 21/316
See application file for complete search history.

(56) References Cited

U.S. PATENT DOCUMENTS

| | | | |
|---|---|---|---|
| 9,503,451 B1 * | 11/2016 | Kane-Parry | ........... H04L 63/083 |
| 2005/0080766 A1 * | 4/2005 | Ghatare | ........... G06F 17/30427 |
| 2006/0020814 A1 | 1/2006 | Lieblich et al. | |

(Continued)

FOREIGN PATENT DOCUMENTS

| | | |
|---|---|---|
| CN | 104813355 A | 7/2015 |
| CN | 104881783 A | 9/2015 |

OTHER PUBLICATIONS

Extended European Search Report dated Mar. 22, 2017 in Patent Application No. 17154592.4.

(Continued)

*Primary Examiner* — Jeffrey D. Popham
(74) *Attorney, Agent, or Firm* — Xsensus LLP (57) ABSTRACT

A method comprising partitioning a space of user requests into subsets, and determining a risk score for a user request based on the evolution of the number of user requests in the subset of user requests to which this user request belongs.

14 Claims, 8 Drawing Sheets

(56) References Cited

U.S. PATENT DOCUMENTS

| | | | |
|---|---|---|---|
| 2006/0179113 | A1 | 8/2006 | Buckingham et al. |
| 2009/0089869 | A1* | 4/2009 | Varghese ............... G06F 21/31 726/7 |
| 2010/0076922 | A1 | 3/2010 | Hariharan et al. |
| 2014/0040152 | A1 | 2/2014 | Fang et al. |
| 2014/0096272 | A1* | 4/2014 | Makofsky ............... G06F 21/31 726/34 |
| 2014/0122343 | A1 | 5/2014 | Einav et al. |
| 2014/0283085 | A1* | 9/2014 | Maestas ............. H04L 63/0236 726/25 |
| 2015/0186901 | A1 | 7/2015 | Miltonberger |
| 2017/0070415 | A1* | 3/2017 | Bell ........................ H04L 43/16 |

OTHER PUBLICATIONS

Avanish Pathak, "An analysis of various tools, methods and systems to generate fake accounts for social media", College of Computer and Information Science, Northeastern University, Boston, Massachusetts, Dec. 2014. http://www.ccs.neu.edu/home/cbw/pdf/thesis-pathak14.pdf.

Bruce Schneier, "Schneier on Security (blog)", posted on Nov. 8, 2013. https://www.schneier.com/blog/archives/2013/11/risk-based_auth.html.

Deloitte, "Risk-based Authentication: A Primer", retrieved from web on Sep. 7, 2017. http://deloitte.wsj.com/cio/2013/10/30/risk-based-authentication-a-primer.

Pavel Kordik, "Feature Extraction From Time Series", Computational Intelligence Group, MI-PDD-Data Preprocessing Module (2011/2012), Lecture 8, http://www.storagecraft.com/blog/risk-based-authentication.

Silvia Farraposo, Philippe Owezarski, and Edmundo Monteiro., "An Approach to Detect Traffic Anomalies", School of Technology and Management-Polytechnic Institute of Leiria-Leiria-Portugal, LAAS CNRS—Toluse-France, University of Coimbra—Departament de Engenharia-Coimbra-Portugal. http://projects.laas.fr/METROSEC/SARSSI07_SilviaFarraposo, published 2007.

"Risk-Based Authentication System". http://www.storagecraft.com/blog/risk-based-authentication, published Oct. 24, 2014.

Taiyeong Lee, Ruiwen Zhang, Yongqiao Xiao, and Jared Dean, "Feature Extraction Methods for Time Series Data in SAS Enterprise Miner", SAS Institute Inc., pp. 1-14, http://www.storagecraft.com/blog/risk-based-authentication, published 2014.

Office Action dated Oct. 11, 2019 issued in corresponding Chinese Patent Application No. 201710064198.3, with English Translation, 21 pages.

* cited by examiner

Fig. 1

User Registration

Name: John [21] | Doe [22]
First Name | Last Name

Title: Mr. [23]

Email: john.doe@organization1.com [24]

Country: US [25]

Telephone: +1 1115555 [26]

Register [27]

METHOD, APPARATUS AND SYSTEM FOR CALCULATING A RISK SCORE OF A USER REQUEST BY A USER ON A WEB APPLICATION

TECHNICAL FIELD

The present disclosure generally pertains to methods, apparatus and systems for securing web services.

TECHNICAL BACKGROUND

In recent times organizations have increasingly become victim to attacks on their web services. These attacks are mostly originating from organized crime, often targeted at money fraud. Part of the attacks, often the ones that are large scale and appear in the news headlines, are a preparation step for the fraud, for example by stealing account credentials, credit card details, etc.

Many known fraud schemes make use of "fake" accounts that these criminals create themselves on the service that they sought out for their attack. Fake account creation is usually the first step in many further attacks, so the sooner fake accounts are detected, the less problems appear later when the created accounts are used in fraudulent transactions, spamming, phishing etc. In order to stay invisible to the service/web application, hackers may create accounts from many different machines, typically by using botnets.

SUMMARY

Although there exist techniques for securing web applications services, it is generally desirable to find improved techniques for securing web services.

According to a first aspect the disclosure provides a method comprising partitioning a space of user requests into subsets, and determining a risk score for a user request based on the evolution of the number of user requests in the subset of user requests to which this user request belongs.

According to a further aspect the disclosure provides an apparatus comprising a processor configured to partition a space of user requests into subsets, and to determine a risk score for a user request based on the evolution of the number of user requests in the subset of user requests to which this user request belongs.

According to a yet further aspect the disclosure provides a system comprising: a server hosting a web application; and an apparatus comprising a processor configured to partition a space of user requests into subsets, and to determine a risk score for a user request based on the evolution of the number of user requests in the subset of user requests to which this user request belongs.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

A method as disclosed in the embodiments below comprises partitioning a space of user requests into subsets, and determining a risk score for a user request based on the evolution of the number of user requests in the subset of user requests to which this user request belongs.

The user requests may relate to operations of a user on a web application. A web application may for example be a client-server software application, a web service, a cloud service, or the like, e.g. a web service provided by an organization to users. A server may for example be controlled by a service providing organization. A client may for example be a web browser that is controlled by a user. Common web applications are for example webmail, entertainment services, online gaming, online retail sales, online auctions, wilds, instant messaging services and many other services.

A user interacts with a web application, web service or cloud service via user requests. A user request is typically issued by the client to the server when the user initiates a specific operation on the web application or when the user requests specific information from the web application. A user request may for example relate to retrieving content from the web application, such as retrieving a news article from a news portal or such as retrieving a video from a video streaming service.

In the specific embodiments described below the user requests relate to an account creation operation, an electronic wallet top up operation, a purchase operation, a login operation, a feedback operation (e.g. user comments on a web service) or a change operation (e.g. changes to the bank account information of a user account of a web service).

A user request may be represented by data that is recorded by the web application when a user interacts with the web application. The web application may for example record information concerning the user request in a database entry that represents the user request.

A space of user requests may be any set of user requests, for example all user requests that have been collected or received e.g. by a web application, for example in a predetermined period of time, or a subportion or predefined subportion of user requests, for example all user requests that have been collected or received e.g. by a web application, for example in a predetermined period of time, and which relate to an account creation operation.

A user request may for example be represented by a database entry that comprises several data fields. Each data field may reflect a specific information related to the user request.

For example, a user may create an account on a web application in order to gain access to the services provided by the web application. In this example the user fills in a registration form with information about his identity. For example, the user provides his first name, last name, title, email address, telephone number and country to the web application in order to create the account. As soon as the user has filled out the respective fields of the registration form he presses a submit button (or "create account" button) which initiates a respective user request to the web application.

A user request in this specific example of an account creation operation may for example be a POST request which is one of many request methods supported by the HTTP protocol used by the World Wide Web. By design, the POST request method requests that a web server accepts and stores the data enclosed in the body of the request message. The POST request embeds the data fields defined in the registration form as key-value-pairs, the key-value pairs being separated by an '&' character. The web application reads the key-value pairs from the POST request and initiates the respective operation based on the data fields included in the POST request. In the example of the account creation operation the web application registers the user by creating a respective user account on the web service.

Upon receiving a user request the web application may log the information related to the user request in a database. In the case of the account creation request, a database entry representing a user request may for example include the above described data fields first name, last name, title, email address, telephone number and country.

There exist many alternative embodiments to implement a user request. For example, the World Wide Web and H are based on a number of request methods including POST and GET as well as PUT, DELETE, and several others.

A user request may for example also comply to REST standard by which systems interface with external systems as web resources identified by Uniform Resource Identifiers (URIs).

Many other ways of retrieving information that represents a user request can be used in the embodiments. For example, a web application may retrieve information about the platform that issued a user request. A platform may be any client that issues requests to a server, for example a web browser, an operating system, a computer program that embeds a user agent, etc. A web application may for example identify the platform that issued a user request by means of the HTTP_USER_AGENT field. For example, a php based web application may retrieve this information by querying the web server via the command $_SERVER['HTTP_USER_AGENT']. A web client typically sets HTTP_USER_AGENT to a specific text string that allows an identification of the client. For example, the text string "Mozilla/5.0 (PLAYSTATION 3; 2.00)" identifies the Playstation 3 as platform that issued the user request. Using HTTP_USER_AGENT the web application may thus conclude on the specific platform that issued the user request. A platform identifier may thus be stored as an additional data field in a database entry that reflects a user request.

As it was exemplarily described above with respect to the account creation operation, each user request may be represented in a database as a database entry comprising data fields that define the user request. Alternatively, a user request may also be represented as a row in a list, each row comprising data fields, or the like.

Analysis of historical traffic data sets performed by the inventors revealed that part of the malicious user requests can be identified by searching for anomalies in the web traffic that is related to user requests issued from client to a web application, e.g. anomalies in the evolution of the number of user requests per time. These anomalies are visible as sudden changes in, for example, a time series of subsequent requests from a well-chosen request subset, e.g., all requests originating from accounts of the same email domain.

According to a specific embodiment, a space of user requests is partitioned according to one or more of the data fields defined in the database.

Partitioning of requests into subsets may be an unsupervised partitioning, which means that no prior knowledge of the subsets is needed.

The space of user requests may be partitioned into subsets according to a domain name related to a respective user request, and/or according to a country of origin related to a respective user request, and/or according to a platform identifier related to a respective user request.

A domain name may, for example, be retrieved from an email address related to the user request. If, for example, a user tries to register an account on a web application using the email address john.doe@organization1.com, organization1.com may be used as domain in partitioning the user requests into subsets.

Partitioning the space of user requests into subsets may for example comprise identifying and grouping together all user requests that have identical value(s) in one or more predefined data field(s), e.g. identifying and grouping together all user requests that relate to the same domain and/or that originate from the same country.

Observing the user requests in the subsets of user requests may provide information about anomalous activity of user requests. Anomalous activity of user requests may indicate fraudulent use of the web application. In the case of account creation operations, fake account creation may constitute a fraudulent use of the web application.

The methods disclosed below may determine a risk score for a user request based on the evolution of the number of user requests in the subset of user requests to which the user request belongs.

A risk score may, for example, be a number, entity, matrix or the like that reflects whether or not, or how likely it is that user requests in a respective subset of user requests to which the risk score is attributed to reflect a fraudulent use of a web application. A risk score may for example be a number between 0 and 1 where 0 reflects a very low probability of fraudulent use, whereas 1 reflects a very high probability of fraudulent use.

The evolution of the number of user requests may for example be described by any quantity or measure that is capable of describing how the number of user requests changes with time.

For example, according to an embodiment, a time series is determined for the subset of user requests, and in which the risk score for the user request is determined based on this time series.

A time series may for example be a time series of frequency data that relates several instances in time with respective user request rates at the corresponding instances of time.

A time series may, for example, be stored as a database entry in a database.

According to an embodiment, for every incoming user request, the time series of the respective subset of user requests to which the incoming user request belongs is updated.

According to an embodiment, it is calculated from the time series whether there is a recent sudden increase in the evolution of the number of user requests in the subset to which the time series corresponds. The risk score may then be set according to whether or not there is a recent sudden increase in a traffic pattern of the user requests.

The proposed techniques must not necessarily guarantee that a user request relates to a misuse. It is sufficient that the proposed techniques provide an indication that something suspicious is happening due to sudden traffic increase and more attention is needed to check it. Accordingly, the determining of a time series may be combined with other checks to reduce false positives. E.g. a sudden increase in number of requests in a particular subset may be an indication that a fraudster has started an automated attack. However, the sudden increase could also be there simply because a promotion campaign has started which attracted a lot of new customers on the day that the campaign started. Therefore additional checks may be done to distinguished malicious requests from benign requests. One possible way to check for maliciousness of detected anomalous requests is to check whether many requests in the subset use the same password. This may be a strong indication that these requests originate from a fraudster performing an automated attack. Another possible indication for an automated attack is when many requests in the subset have the same IP address and User Agent combination. This is why the anomaly detection technique described in this application may be combined with other checks like a frequency analysis of password usage or a frequency analysis of IP-address+User Agent combination.

According to an embodiment, STL methods and/or ESD methods may be used to automatically detect anomalies in the time series in real time. STL is an acronym for "Seasonal and Trend decomposition using Loess", while Loess is a method for estimating nonlinear relationships. STL is a very versatile and robust method for decomposing time series. The acronym ESD stands for the generalized Extreme Studentized Deviate test that can be used to detect one or more outliers in a univariate data set that follows an approximately normal distribution.

According to an embodiment, determining a risk score for a user request is done in each subset independently.

According to an embodiment, the user requests relate to account creation operations and the risk scores are used to detect fake account creations.

According to an embodiment, a notification is generated if the risk score of a user request exceeds a predefined value. The notification may for example be sent to an information security operations center and/or to a network operation center.

According to an embodiment, user requests are blocked if they belong to a subset of user requests with a risk score that exceeds a predefined value or that lies within a specific predefined range/region which is indicative of fraudulent use of the web application. Many other actions are possible, like delaying a response, requesting a captcha or requesting the end user to authentication with 2-factor authentication before proceeding. Other actions which may be taken are banning or suspending the user account, blacklisting the IP address or adding the user account to a high risk group for further monitoring by the anomaly detection apparatus.

The methods disclosed here may be used to monitor one or multiple web applications.

The methods as described herein are also implemented in some embodiments as a computer program causing a computer and/or a processor to perform the method, when being carried out on the computer and/or processor.

In some embodiments, also a non-transitory computer-readable recording medium is provided that stores therein a computer program product, which, when executed by a processor, such as the processor described above, causes the methods described herein to be performed.

Below is also disclosed an apparatus comprising a processor configured to partition a space of user requests into subsets, and determine a risk score for a user request based on the evolution of the number of user requests in the subset of user requests to which this user request belongs.

The apparatus may be arranged as part of a fraud and anomaly detection system.

The apparatus may further be connected to a server that hosts the web application. The apparatus may, for example, be connected to the server hosting the web application by means of a computer network.

The apparatus may be realized as a single server or as a distributed system, e.g. in the form of a cloud service. The processor may be a single CPU, or it may be implemented as multiple CPUs, e.g. CPUs that are residing in a single server computer or that are locally distributed in the sense of a cloud processing environment.

According to an embodiment, the apparatus is further connected to an information security operations center and/or to a network operation center. This connection may be realized by one or more computer networks such as, for example, LANs and WANs.

According to an embodiment, the partitioning of the user requests into subsets and determining a risk score for a user request in a subset is performed by a fraud and anomaly detection system.

Below it is also disclosed a system comprising a server hosting a web application; and an apparatus comprising a processor configured to partition a space of user requests into subsets, and to determine a risk score for a user request based on the evolution of the number of user requests in the subset of user requests to which this user request belongs.

User requests may be collected by a web application and passed to the fraud and anomaly detection system.

Figure 1:
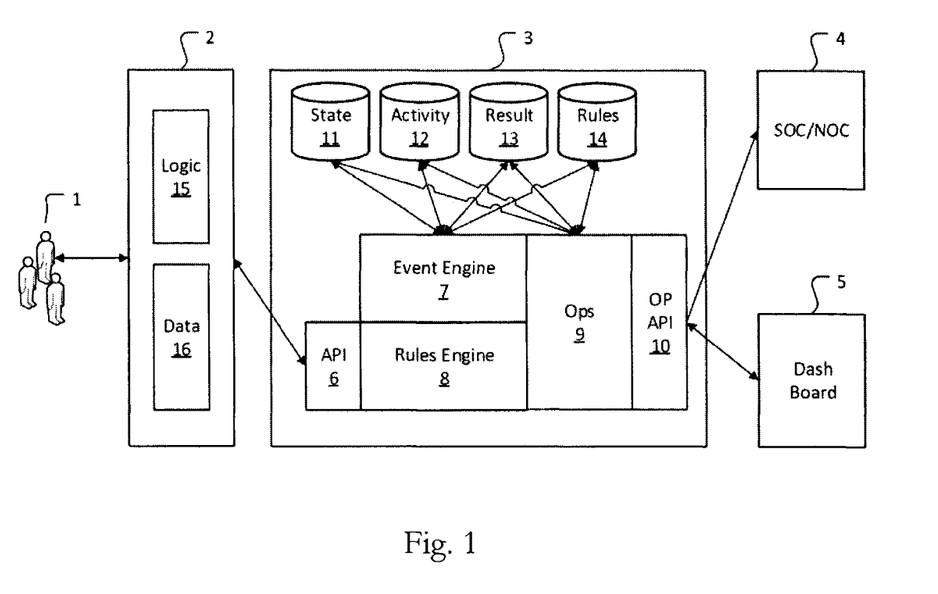
FIG. 1 schematically shows a system comprising a web application that is monitored by a risk and anomaly detection apparatus.

FIG. 1 schematically shows a system comprising a web application 2 that is monitored by a risk and anomaly detection apparatus 3. Users 1 are interacting with the web application 2, e.g. via a web browser. The web application 2 comprises a logic 15 and a data base 16. The logic 15 is arranged to provide a web service to the users 1, e.g. an online gaming service. The web application 2 receives user requests from the users 1, e.g. a user request that is related to an account registration operation. The web application 2 logs data related to such user requests as data entries in a data base 16. The web applications 2 passes this data to risk and anomaly detection apparatus 3 for further analysis.

The risk and anomaly detection apparatus 3 comprises an API 6 which is used by the web application 2 to communicate with the risk and anomaly detection apparatus 3, in particular to pass data entries related to user requests to the risk and anomaly detection apparatus 3. The risk and anomaly detection apparatus 3 further comprises an event engine 7 that stores the received data in an activity data base 12. The detection of suspicious events in event engine 7 is based on predefined rules that are stored in a rules data base 13 and that are applied by a rules engine 8 on the data stored in the activity database 12. For example, event engine 7 may conclude that specific user requests reflect a fraudulent use of the web application 2 with some likelihood if the traffic of user requests in a unique subset of the user requests stored in activity database 12 shows an anomaly. If an anomalous activity is detected by the event engine 7 then the event engine 7 changes the state information in a state database 11. The state information stored in state database 11 reflects if there is a sign of fraudulent use in one of the subsets of user requests. If, for a specific subset of user requests, the state information stored in state database 11 reflects that there is a high likelihood of fraudulent use in this subset of user requests, then a corresponding analysis result is stored in result database 13 in the form of a risk score.

The risk score is also sent back to web application 2. Upon receiving the risk score the web application 2 will take a decision on how to proceed with the request. If the risk score is above a threshold value, it may decide to block the request. Many other actions are possible, like delaying a response, requesting a captcha or requesting the end user to authentication with 2-factor authentication before proceeding. Other actions which may be taken are banning or suspending the user account, blacklisting the IP address or adding the user account to a high risk group for further monitoring by the anomaly detection apparatus 3.

If the number of requests with high risk score surpasses a configured number, an operations unit 9 triggers the issuance of a corresponding notification to an information security operation center/network operation center 4 (SOC/NOC). The information security operation center/network operation center 4 (SOC/NOC) then may decide that the user requests in the suspicious subset of user requests are blocked from accessing the web application 2. When many alerts are received by the SOC/NOC 4, it may trigger security operators to investigate whether urgent manual actions need to be taken. In addition, administrators may use a dash board application 5 to access the data collected in and established by the risk and anomaly detection apparatus 3. For example, an administrator may study a graph displaying a time series that represents the rate of user requests in a specific subset of user requests. Based on such an analysis of one or more time series, the administrator may conclude on new rules or amendments to existing rules that are appropriate to detect anomalies in the traffic of user requests.

The target of some of the rules in the rule engine 8 may be to detect anomalies in subsets of user requests. In this case the state database 11 stores for each subset of requests an object that contains the frequencies of all past user requests in that subset over a certain period of time, for example the past week. When a new request is received, it is determined to which subset the request belongs and the corresponding frequencies object is retrieved from the state database 11 and checked for anomalies.

Figure 2:
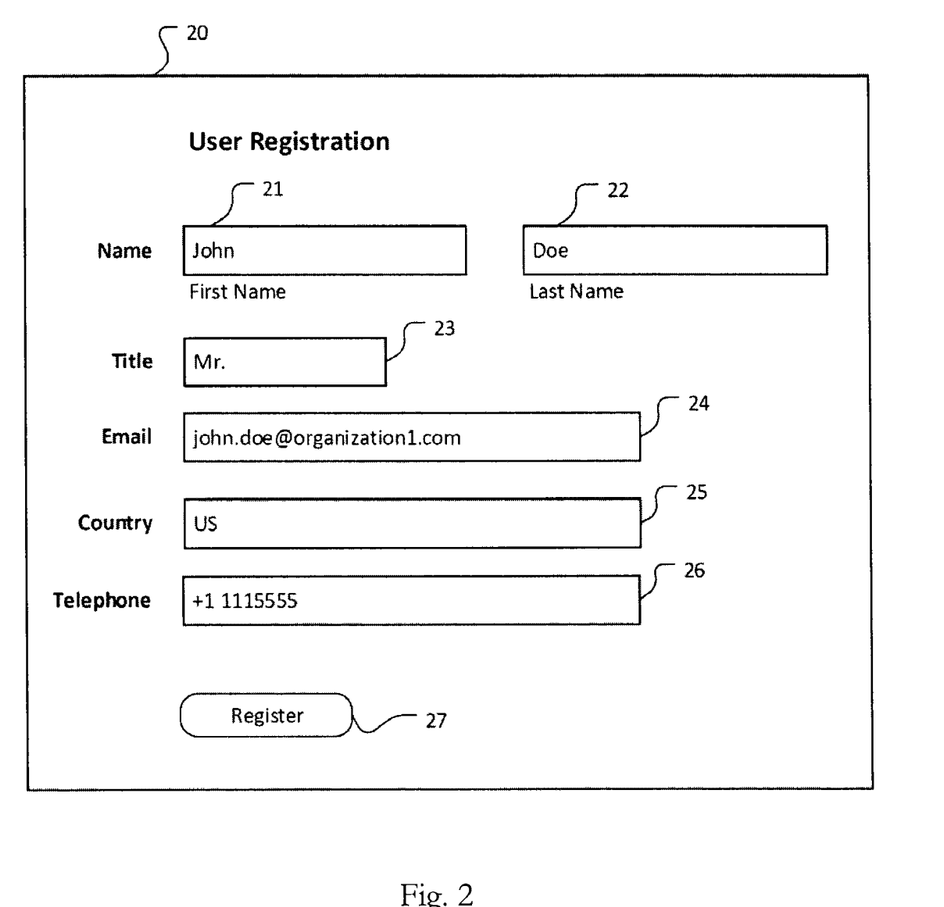
FIG. 2 shows a registration form as an exemplary user operation on a web application which results in a user request being issued to the web application.

FIG. 2 shows a registration form 20 as an exemplary user operation on a web application 2 which results in a user request being issued to the web application 2. The web application 2 provides online services to users, for example an online gaming service. In order to be allowed to make use of the service, users have to register. To this end, the web application presents a registration form 20 to a user in a web browser. The registration form 20 comprises several editable fields 21-26 which the user has to fill out during the registration process. Fields 21 and 22 are foreseen to receive the first name and last name of the user, here first name "John" and last name "Doe". A field 23 is foreseen to receive the title of the user, here "Mr.". A field 24 is foreseen to receive an email address of the user, here "john.doe@organization1.com". In field 25 a user indicates his home country to the service, here the United States, represented by country code "US". A field 26 is foreseen to receive the user's telephone number, here "+1 1115555". As soon as the user has filled out the fields of the registration form he presses a submit button 27, here labeled "Register". Upon pressing the submit button 27, the web browser of the user issues a POST request to the server of the web application. This POST request embeds the data fields defined in the registration form as key-value-pairs, the key-value pairs being separated by an '&' character. The web application can read the key-value pairs from the POST request and initiates the respective operation based on the data fields included in the POST request. In the example of the account creation operation the web application registers the user by creating a respective user account on the web service. Still further, the web application logs data that describes the user request for submission to a fraud and anomaly detection system.

The division of the web application 2 and the risk and anomaly detection apparatus 3 into units as described above is only made for illustration purposes and the present disclosure is not limited to any specific division of functions in specific units. For instance, each of the web application 2 and the risk and anomaly detection apparatus 3 could be implemented by a respective programmed processor, field programmable gate array (FPGA) and the like. Such a programmed processor may, for example, implement the functionality of the event engine 7, the rules engine 8, the operations unit 9, the API 6 and the OP API 10, or the like.

A user request that relates to an account creation operation such as described with regard to FIG. 2 above may be represented as a database entry with data fields "first name", "last name", "title", "email", "country" and "telephone" (21-26 in FIG. 2). An exemplifying list of database entries that represent user requests is depicted below.

TABLE 1

Exemplary database entries that represent user requests

| No. | Last Name | First Name | Title | Email | Country | Telephone | Platform |
|---|---|---|---|---|---|---|---|
| 10201 | Doe | John | Mr. | john.doe@organization1.com | US | +1 1115555 | PS |
| 10202 | Mustermann | Erika | Mrs. | erika.mustermann@organization2.com | DE | +49 123456 | IE |
| 10203 | Joskens | Jos | Dr. | jos.joskens123@organization3.com | BE | +32 999999 | Opera |
| ... | | | | | | | |

According to Table 1, Mr. John Doe from the United States, identified by "US", issued a request to register an account with email address john.doe@organization1.com and telephone "+1 1115555" using a Play Station device as platform, identified by the platform identifier PS. Mrs. Erika Mustermann from Germany, identified by "DE", issued a request to register an account with email address erika.mustermann@organization2.com and telephone "+49 123456" using an Internet Explorer as platform, identified by the platform identifier IE. Dr. Jos Joskens from Belgium, identified by "BE", issued a request to register an account with email address jos.joskens123@organization3.com and telephone "+32 999999" using the Opera web browser as platform, identified by the platform identifier "Opera".

The fields that contain the user's email address are used to derive a domain that is attributed to each user request. For example, Mr. John Doe's request relates to the domain "organization1.com", Mrs. Erika Mustermann's request relates to the domain "organization2.com" and Dr. Jos Joskens' request relates to the domain organization3.com.

Figure 3:
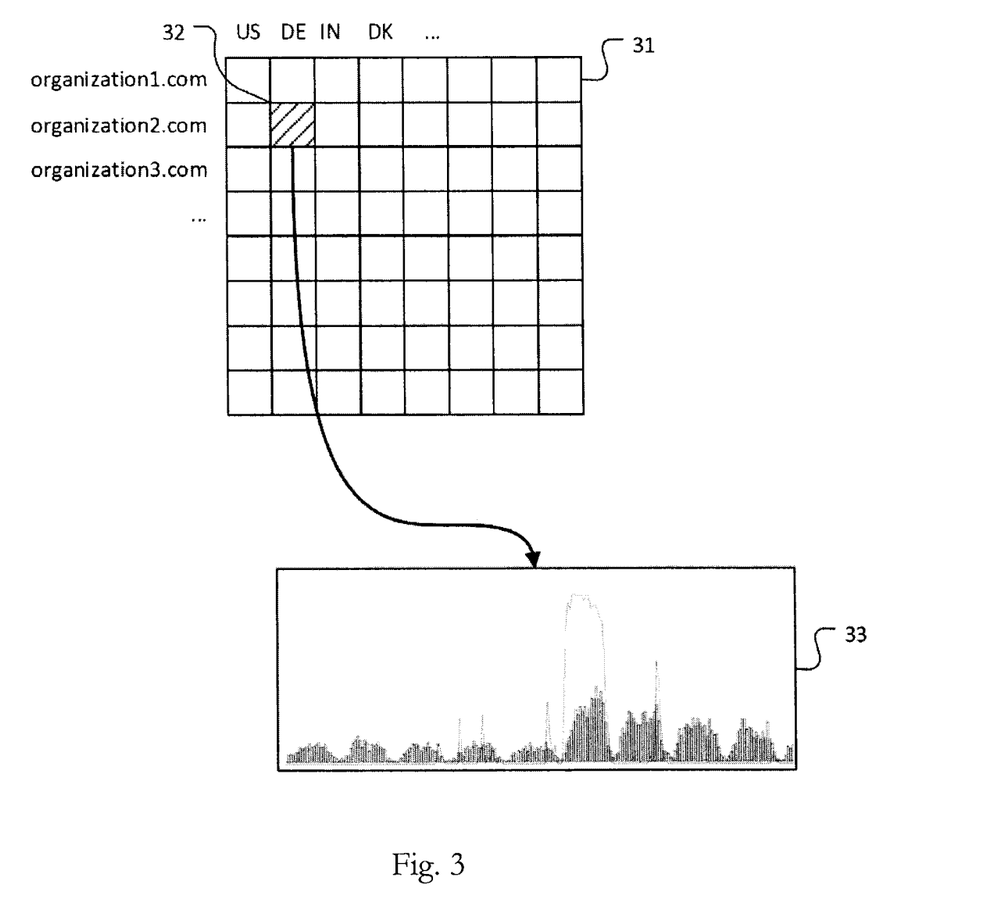
FIG. 3 schematically shows an embodiment of partitioning a space of user requests into subsets according to the attributed domain and country.

FIG. 3 schematically shows an embodiment of partitioning a space of user requests into subsets according to the attributed domain and country. In this embodiment it is assumed that the user requests relate to account creation operations such as described above with regard to FIG. 2 and Table 1. In this example, the space of user requests is partitioned into subsets according to their attributed domain and country. Field 31 represents the space of all user requests. In the horizontal direction of this schematic representation the user requests are grouped according to their country of origin, here "US", "DE", "IN", "DK", and so on. In the vertical direction of this schematic representation the user requests are grouped according to their attributed domain, here "organization1.com", "organization2.com", "organization3.com", and so on. For each subset of user requests there is stored in a database a time series that reflects the rate of user requests in the respective subset at subsequent points in time. In FIG. 3 the time set 33 relates to the subset 32 of user requests that is attributed to the domain organization3.com and country Germany ("DE"). For every incoming user request the time series of the respective subset of user requests to which the incoming user request belongs is updated.

Figure 4:
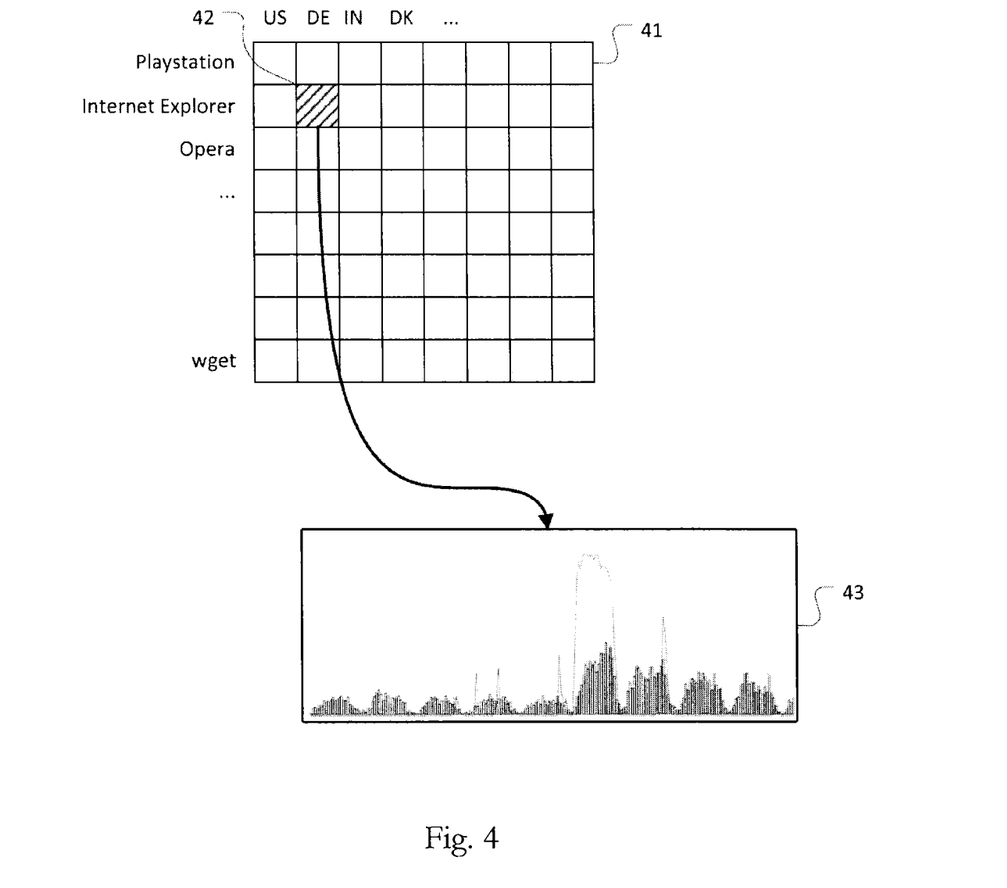
FIG. 4 schematically shows an embodiment of partitioning a space of user requests into subsets according to the attributed country and platform.

FIG. 4 schematically shows an embodiment of partitioning a space of user requests into subsets according to the attributed country and platform. In this embodiment it is again assumed that the user requests relate to account creation operations such as described above with regard to FIG. 2 and Table 1. In this example, the space of user requests is partitioned into subsets according to their attributed country and platform. Field 41 represents the space of all user requests. In the horizontal direction of this schematic representation the user requests are grouped according to their country of origin, here "US", "DE", "IN", "DK", and so on. In the vertical direction of this schematic representation the user requests are grouped according to their attributed platform identifier, here PlayStation, Internet Explorer, Opera, and so on. For each subset of user requests there is stored in a database a time series that reflects the rate of user requests in the respective subset at subsequent points in time. In FIG. 4 the time series 43 relates to the subset 42 of user requests that were issued using the Internet Explorer platform by a user attributed to the country Germany ("DE"). As in the embodiment of FIG. 3, for every incoming user request the time series of the respective subset of user requests to which the incoming user request belongs is updated.

Table 2 below describes in an exemplifying way how a fraud and anomaly detection system can conclude on a platform identifier from e.g. the HTTP-USER-AGENT string that can be recorded by a web server for each incoming HTTP request. The left column of Table 2 below shows the HTTP-USER-AGENT strings as retrieved by a php $_SERVER['HTTP_USER_AGENT'] command in connection with an incoming user request. The right column of Table 2 represents a platform identifier attributed to the respective HTTP_USER_AGENT string, and, in parenthesis, a corresponding name of the platform.

TABLE 2

Exemplary mapping of HTTP_USER_AGENT strings to platform ID

| HTTP_USER_AGENT | Platform ID (Name) |
| --- | --- |
| Mozilla/5.0 (PLAYSTATION 3; 3.55) | PS (PlayStation) |
| Mozilla/5.0 (PLAYSTATION 3; 2.00) | |
| Mozilla/5.0 (PLAYSTATION 3; 1.00) | |
| Mozilla/5.0 (Windows NT 6.1; WOW64; Trident/7.0; AS; rv: 11.0) like Gecko | IE (Internet Explorer) |
| Mozilla/5.0 (compatible, MSIE 11, Windows NT 6.3; Trident/7.0; rv: 11.0) like Gecko | |
| Opera/9.63 (Macintosh; Intel Mac OS X; U; en) Presto/2.1.1 | Opera (Opera Browser) |
| Wget/1.9.1 | wget (GNU wget command) |
| Wget/1.6 | |

As can be seen in Table 2 above, each platform may be represented by multiple alternative HTTP_USER_AGENT strings. For example, all three strings "Mozilla/5.0 (PLAYSTATION 3; 3.55)", "Mozilla/5.0 (PLAYSTATION 3; 2.00)", "Mozilla/5.0 (PLAYSTATION 3; 1.00)" map to the same platform, namely to the PlayStation platform, identified by platform identifier "PS".

Figure 5:
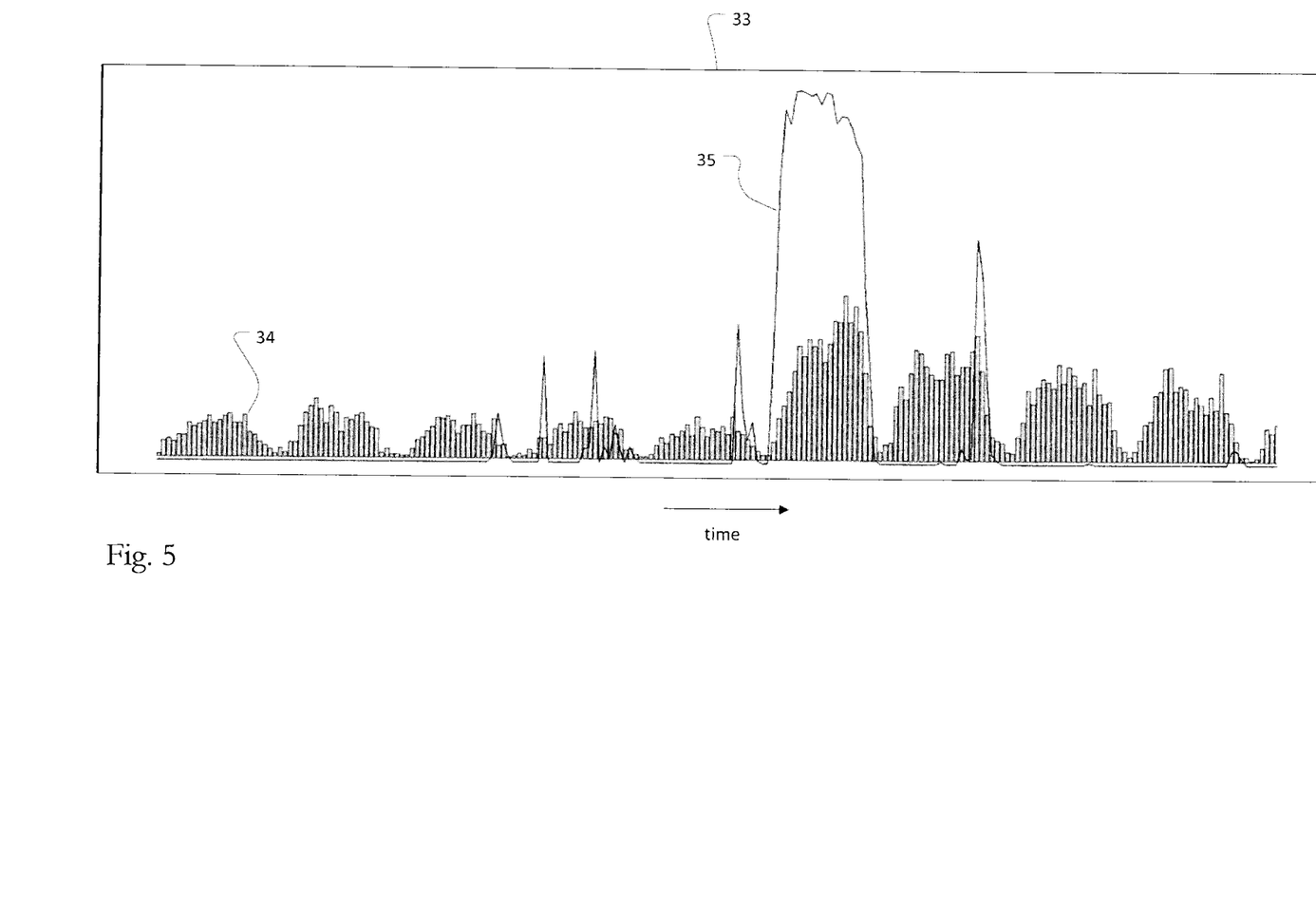
FIG. 5 shows an exemplifying time series that comprises frequency data of user requests in a subset of user requests which is determined according to country and domain.
Figure 8A:
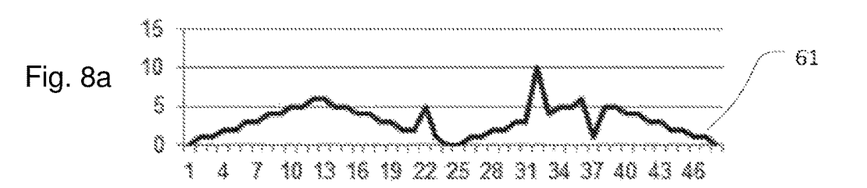
FIGS. 8a-e schematically show an exemplary algorithm for detecting anomalies in a time series.
Figure 8B:
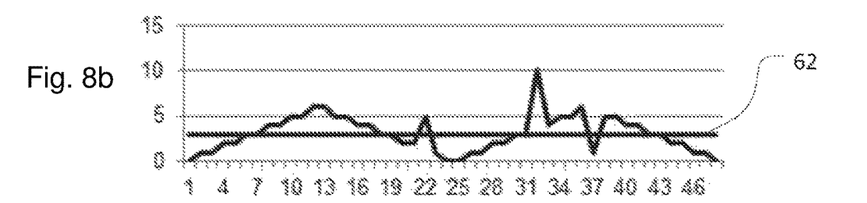
Figure 8C:
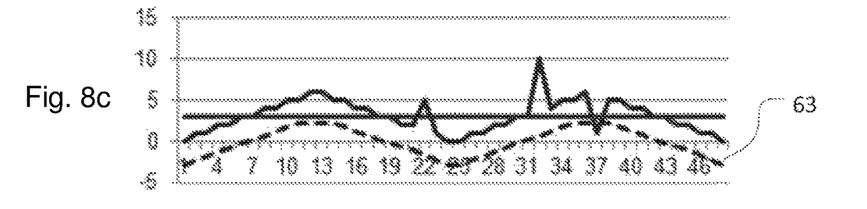
Figure 8D:
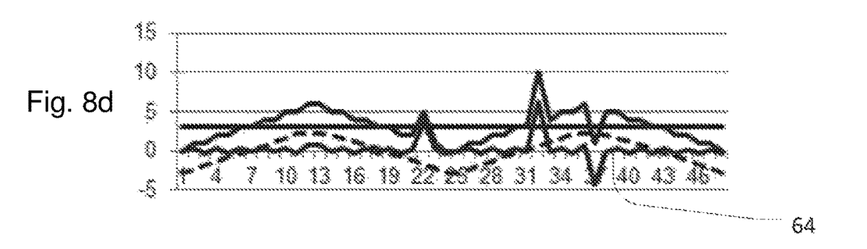
Figure 8E:
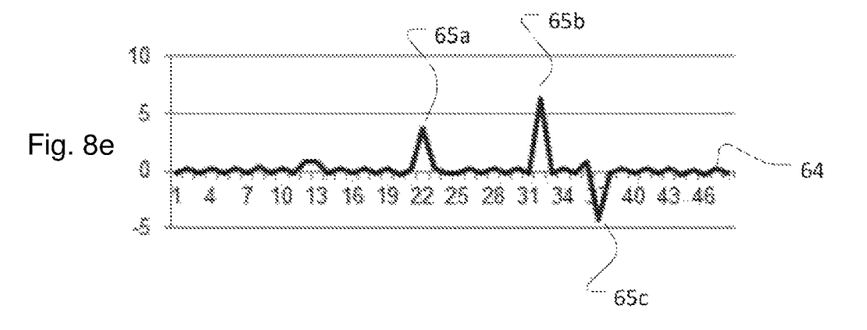

FIG. 5 shows a more detailed view of an exemplifying time series 33 that comprises frequency data 34 of user requests in a subset of user requests which is determined according to country and domain. Time series 33 is a time series of frequency data 34 that relates several instances in time with respective user request rates at the corresponding instances in time. Each block of the frequency data 34 represents the number of user requests that has been counted within a specific time interval that corresponds to the breadth of the box in the horizontal time direction. The time series is stored as database entry in a database (for example in state database 11 of FIG. 1). Based on the frequency data 34 a risk score 35 is computed. In the embodiment of FIG. 5, for example, the risk score is computed according to an STL scheme as it is explained in more detail below with regard to FIG. 8. To some extent simplified, one can observe that the risk score 35 is large where the change in the rate of user requests is large, and vice versa.

The risk score 35 of this embodiment is a value that reflects how likely it is that user requests in the respective subset of user requests correspond to a fraudulent use of a web application. For every incoming user request the frequency data 34 of the respective subset of user requests to which the incoming user request belongs is updated.

The time series of FIG. 5 shows that even if for a create account operation as described below one might not see anything suspicious in the total traffic of user requests to a web application, one may, if looking at the traffic combining domain name and a country, get clear visible anomalies, which may indicate a misuse of the web application. The risk and anomaly detection method according to this embodiment thus exploits the observation that user requests that relate to a fraudulent use of a web application such as botnet attacks can have a regional character, that is, the nodes of one specific botnet may be mostly located in one region of the world only.

Figure 6:
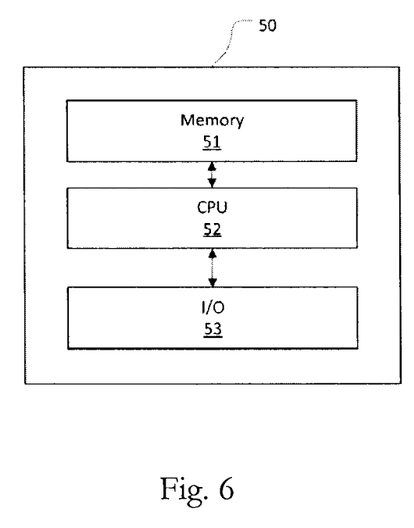
FIG. 6 schematically describes an embodiment of a computer system that may be used to implement a risk and anomaly detection apparatus and/or a web application.

FIG. 6 schematically describes an embodiment of a computer system 50 that may be used to implement the risk and anomaly detection apparatus 3 and/or the web application 2. This computer system 50 comprises a memory for storing data 51 (e.g. the data stored in databases 11, 12, 13, 14), a processor 52 for running program code that, when executed, performs the above described methods, and an I/O interface 53 for communicating with external devices (for example for sending notifications from OP API 10 to SOC/NOC 4, or the like). This computer system may be realized as a single server or as a distributed computer system, e.g. in the form of a cloud service. The processor 52 may be a single CPU, or it may be implemented as multiple CPUs, e.g. CPUs that are residing in a single server computer or that are locally distributed in the sense of a cloud processing environment.

Figure 7:
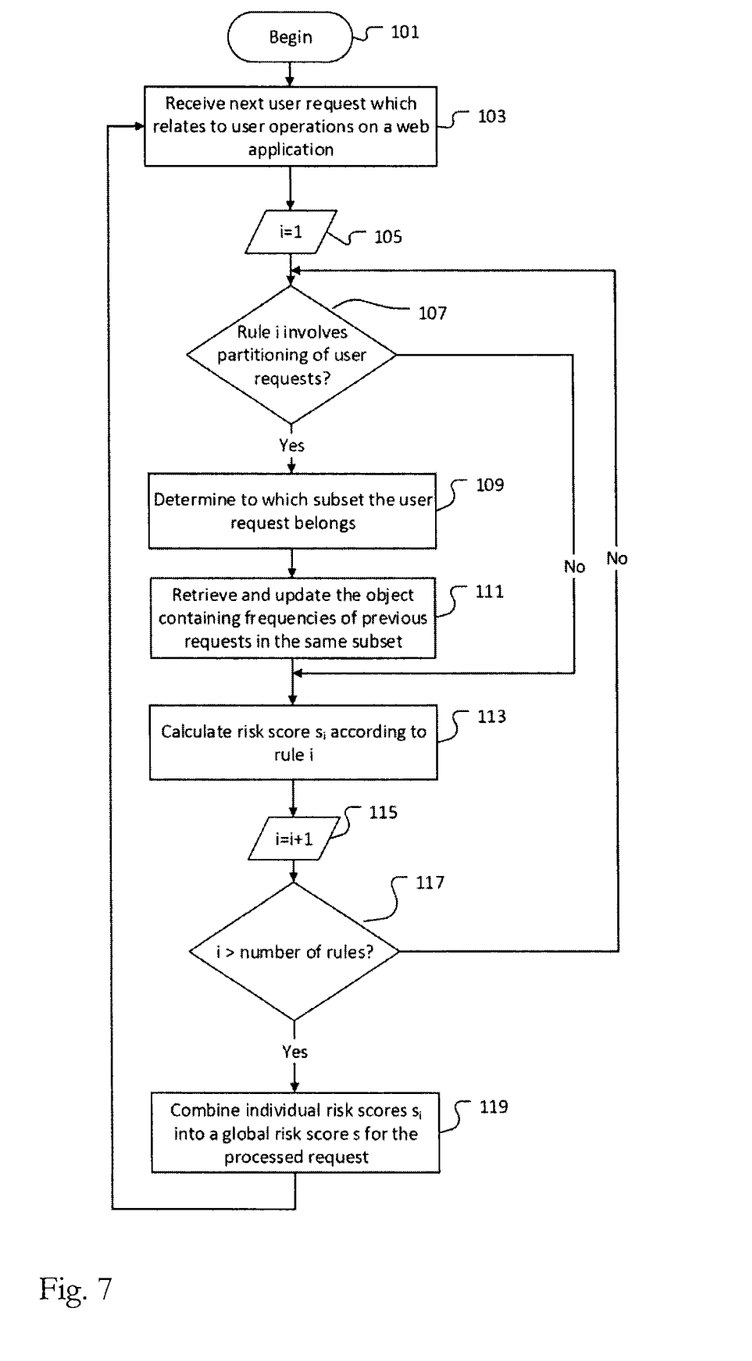
FIG. 7 schematically describes an embodiment of a method for determining risk scores from user requests to a web application.

FIG. 7 schematically describes an embodiment of a method for determining risk scores from user requests to a web application. At 101, the method begins. At 103, the next user request which relates to user operations on a web application is received. At 105, a counter i is initialized to 1. At 107, it is checked whether rule i involves partitioning of a space of user requests into subsets. If the check at 107 results in yes, the method proceeds with 109. If the check at 107 results in no, the method proceeds with 113. At 109, it is determined to which subset the user request belongs. At the 111, the object that contains the frequencies of the previous requests in the same subset is retrieved from the state database 11. This object is updated with the newly received request. At 113, the risk score $s_i$ for the newly received request is calculated according to rule i. At 115, the counter i is incremented. At 117, it is checked whether the counter i has reached the total number of rules. If the check at 117 results in no, the method returns to 107. If the check at 117 results in yes, the method proceeds to 119. At 119, the individual risk scores $s_i$ are combined into a global risk score s for the newly received request. After 119, the method returns to 103.

FIGS. 8*a-e* schematically show an exemplary algorithm for detecting anomalies in a time series. FIG. 8*a* shows an exemplary time series 61 consisting of 50 time samples. The user request rate in each time sample is plotted on the vertical axis. From this time series 61 it is calculated a median 62 which reflects the trend in the user requests (see FIG. 8*b*). Further, a polynomial approximation is applied to the time series 61 after subtracting the median 62 to obtain a polynomial approximation 63 of the time series 61 (see FIG. 8*c*). This polynomial approximation 63 is subtracted from the time series 61 to extract the fluctuations 64 of the time series as remaining component (see FIG. 8*d*). Then outliers 65*a,b,c* in the fluctuations 64 are determined (see FIG. 8*e*). This determination of outliers 65*a,b,c* may for example be based on a comparison of the fluctuations 64 with a threshold value or using STL (Seasonal and Trend decomposition using Loess) methods and/or ESD (Extreme Studentized Deviate) tests.

It should be recognized that the embodiments describe methods with an exemplary sequence of method steps. The specific sequence of method steps is however given for illustrative purposes only and should not be construed as binding.

The methods described above can also be implemented as a computer program causing a computer and/or a processor, such as processor 52 in FIG. 6 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A method comprising
partitioning a space of user requests into subsets, and
determining a risk score for a user request based on the evolution of the number of user requests in the subset of user requests to which this user request belongs.

(2) The method of (1) in which each user request is represented in a database as a database entry comprising data fields and in which the space of user requests is partitioned according to one or more of the data fields defined in the database.

(3) The method of anyone of (1) or (2) in which the space of user requests is partitioned into subsets according to a domain name related to a respective user request, and/or according to a country of origin related to a respective user request, and/or according to a platform identifier related to a respective user request.

(4) The method of anyone of (1) to (3) in which a time series is determined for the subset of user requests, and in which the risk score for the user request is determined based on this time series.

(5) The method of (4) in which the time series is a time series of frequency data.

(6) The method of (4) or (5) in which for every incoming user request the time series of the respective subset of user requests to which the incoming user request belongs is updated.

(7) The method of anyone of (4) to (6) in which it is calculated from the time series whether there is a recent sudden increase in the evolution of the number of user requests in the subset to which the time series corresponds.

(8) The method of (7) in which the determining of a time series is combined with other checks to reduce false positives.

(9) The method of anyone of (1) to (8) in which Seasonal and Trend decomposition methods and/or ESD methods are used to automatically detect anomalies in the times series in real time.

(10) The method of anyone of (1) to (9) in which the determining a risk score for a user request is done in each subset independently.

(11) The method of anyone of (1) to (10) in which the user requests relate to an account creation operation, an electronic wallet top up operation, a purchase operation, a login operation, a feedback operation or a change operation.

(12) The method of anyone of (1) to (11) in which the user requests relate to account creation operations and in which the risk scores are used to detect fake account creations.

(13) The method of anyone of (1) to (12) in which a notification is generated if the risk score of a user request exceeds a predefined value for a predefined number of user requests.

(14) The method of anyone of (1) to (13) in which, if a user request belongs to a subset of user requests with a risk score that exceeds a predefined value, the user request is blocked, a response to the user request is delayed, a captcha is requested from the user who issued the user request, the user is requested to authentication with 2-factor authentication before proceeding, the user account is banned or suspended, the IP address corresponding to the user request is blacklisted, or the user account is added to a high risk group for further monitoring.

(15) The method of anyone of (1) to (14) in which the partitioning of the space of user requests into subsets and the determining a risk score for a user request in a subset is performed by a fraud and anomaly detection system.

(16) The method of anyone of (1) to (15) in which the user requests are collected by a web application and passed to the fraud and anomaly detection system.

(17) An apparatus comprising a processor configured to partition a space of user requests into subsets, and determine a risk score for a user request based on the evolution of the number of user requests in the subset of user requests to which this user request belongs.

(18) The apparatus of (17) which is further arranged as part of a fraud and anomaly detection system.

(19) The apparatus of (17) which is further connected to an information security operations center and/or to a network operation center.

(20) A system comprising:
a server hosting a web application; and
an apparatus comprising a processor configured to partition a space of user requests into subsets, and to determine a risk score for a user request based on the evolution of the number of user requests in the subset of user requests to which this user request belongs.

(21) A computer program comprising program code causing a computer to perform the method according to anyone of (1) to (16), when being carried out on a computer.

(22) A non-transitory computer-readable recording medium that stores therein a computer program product, which, when executed by a processor, causes the method according to anyone of (1) to (16) to be performed.

The invention claimed is:

1. A method comprising:
storing, in a memory, a plurality of predefined rules to calculate an individual numerical risk score, wherein the plurality of predefined rules include at least a first rule and a second rule;
receiving user requests via an internet, the user requests being operations by users on a web application;
determining that the first rule of the plurality of predefined rules involves partitioning of the user requests into a plurality of subsets;
after it is determined that the first rule of the plurality of predefined rules involves partitioning of the user requests into the plurality of subsets, partitioning the user requests into the plurality of subsets according to at least one of a domain name of a respective user request, a country of origin of a respective user request, and a platform identifier of a respective user request;
for each of the plurality of subsets after the partitioning, calculating frequency data representing a number of the user requests that has been counted within a specific time interval; and for each of the plurality of subsets after the partitioning, determining, using processing circuitry, the individual numerical risk score for a user request based on the calculated frequency data;
determining that the second rule of the plurality of predefined rules does not involve partitioning of the user requests into a plurality of subsets;
after it is determined that the second rule of the plurality of predefined rules does not involve partitioning of the user requests into the plurality of subsets, determining, using the processing circuitry, the individual numerical risk score for a user request without partitioning the user request;
combining each of the individual numerical risk scores determined for each of the plurality of predefined rules into a global numerical risk score; and
generating a notification when the global numerical risk score exceeds a predefined value,
wherein the user requests relate to account creation operations, and
the numerical risk score is used to detect fake account creations.

2. The method of claim 1, wherein
each of the user requests is represented in a database as a database entry comprising data fields, and
the user requests are partitioned according to one or more of the data fields defined in the database.

3. The method of claim 1, wherein for every incoming user request, the frequency data of the respective subset of user requests to which the incoming user request belongs is updated.

4. The method of claim 1, further comprising:
determining, from the frequency data, whether there is a recent sudden increase in the number of the user requests in the subset to which the frequency data corresponds.

5. The method of claim 1, further comprising:
checking whether a certain number of the user requests includes using a same password on the web application.

6. The method of claim 1, further comprising:
using Seasonal and Trend decomposition methods and/or Extreme Studentized Deviate methods to automatically detect anomalies in the frequency data in real time.

7. The method of claim 1, wherein the user requests relate to an account creation operation, an electronic wallet top up operation, a purchase operation, a login operation, a feedback operation, or a change operation.

8. The method of claim 1, wherein the user requests are collected by the web application and passed to a fraud and anomaly detection system.

9. The method of claim 1, wherein the user requests are partitioned into the plurality of subsets according to the country of origin of the respective user request and the domain name of the respective user request or the platform identifier of the respective user request.

10. The method of claim 1, wherein the user requests are partitioned into the plurality of subsets based on at least the domain name of the respective user request or the platform identifier of the respective user request.

11. A method comprising:
storing, in a memory, a plurality of predefined rules to calculate an individual numerical risk score, wherein the plurality of predefined rules include at least a first rule and a second rule;
receiving user requests via internet, the user requests being operations by users on a web application;
determining that the first rule of the plurality of predefined rules involves partitioning of the user requests into a plurality of subsets;
after it is determined that the first rule of the plurality of predefined rules involves partitioning of the user requests into the plurality of subsets, partitioning the user requests into the plurality of subsets according to at least one of a domain name of a respective user request, a country of origin of a respective user request, and a platform identifier of a respective user request; for each of the plurality of subsets after the partitioning, calculating frequency data representing a number of the user requests that has been counted within a specific time interval; and for each of the plurality of subsets after the partitioning, determining, using processing circuitry, the individual numerical risk score for a user request based on the calculated frequency data;

determining that the second rule of the plurality of predefined rules does not involve partitioning of the user requests into a plurality of subsets;

after it is determined that the second rule of the plurality of predefined rules does not involve partitioning of the user requests into the plurality of subsets, determining, using the processing circuitry, the individual numerical risk score for a user request without partitioning the user request; and combining each of the individual numerical risk scores determined for each of the plurality of predefined rules into a global numerical risk score, wherein when the global numerical risk score exceeds a predefined value, the user request is blocked, a response to the user request is delayed, a completely automated public Turing test to tell computers and humans apart (captcha) is sent to a user who issued the user request, the user is requested to authenticate with 2-factor authentication before proceeding, a user account of the user is banned or suspended, an IP address corresponding to the user request is blacklisted, or the user account is added to a high risk group for further monitoring, wherein the user requests relate to account creation operations, and the numerical risk score is used to detect fake account creations.

12. An apparatus, comprising:
processing circuitry configured to:
store, in a memory, a plurality of predefined rules to calculate an individual numerical risk score, wherein the plurality of predefined rules include at least a first rule and a second rule;
receive user requests via an internet, the user requests being operations by users on a web application;
determine that the first rule of the plurality of predefined rules involves partitioning of the user requests into a plurality of subsets;
after it is determined that the first rule of the plurality of predefined rules involves partitioning of the user requests into the plurality of subsets, partition the user requests into the plurality of subsets according to at least one of a domain name of a respective user request, a country of origin of a respective user request, and a platform identifier of a respective user request; for each of the plurality of subsets after partitioning the user requests, calculate frequency data representing a number of the user requests that has been counted within a specific time interval; and for each of the plurality of subsets after partitioning the user requests, determine the individual numerical risk score for a user request based on the calculated frequency data;
determine that the second rule of the plurality of predefined rules does not involve partitioning of the user requests into a plurality of subsets;
after it is determined that the second rule of the plurality of predefined rules does not involve partitioning of the user requests into the plurality of subsets, determine, using the processing circuitry, the individual numerical risk score for a user request without partitioning the user request;
combine each of the individual numerical risk scores determined for each of the plurality of predefined rules into a global numerical risk score; and
generate a notification when the global numerical risk score exceeds a predefined value,
wherein the user requests relate to account creation operations, and
the numerical risk score is used to detect fake account creations.

13. The apparatus of claim 12, further comprising a server configured to host the web application.

14. An apparatus, comprising:
processing circuitry configured to:
store, in a memory, a plurality of predefined rules to calculate an individual numerical risk score, wherein the plurality of predefined rules include at least a first rule and a second rule;
receive user requests via internet, the user requests being operations by users on a web application;
determine that the first rule of the plurality of predefined rules involves partitioning of the user requests into a plurality of subsets;
after it is determined that the first rule of the plurality of predefined rules involves partitioning of the user requests into the plurality of subsets, partition the user requests into the plurality of subsets according to at least one of a domain name of a respective user request, a country of origin of a respective user request, and a platform identifier of a respective user request; for each of the plurality of subsets after the partitioning, calculate frequency data representing a number of the user requests that has been counted within a specific time interval; and for each of the plurality of subsets after the partitioning, determine the individual numerical risk score for a user request based on the calculated frequency data;
determine that the second rule of the plurality of predefined rules does not involve partitioning of the user requests into a plurality of subsets;
after it is determined that the second rule of the plurality of predefined rules does not involve partitioning of the user requests into the plurality of subsets, determine, using the processing circuitry, the individual numerical risk score for a user request without partitioning the user request; and
combine each of the individual numerical risk scores determined for each of the plurality of predefined rules into a global numerical risk score, wherein
when the global numerical risk score exceeds a predefined value, the user request is blocked, a response to the user request is delayed, a completely automated public Turing test to tell computers and humans apart (captcha) is sent to a user who issued the user request, the user is requested to authenticate with 2-factor authentication before proceeding, a user account of the user is banned or suspended, an IP address corresponding to the user request is blacklisted, or the user account is added to a high risk group for further monitoring,
wherein the user requests relate to account creation operations, and
the risk score is used to detect fake account creations.

* * * * *